United States Patent
Kwon

(10) Patent No.: US 7,967,475 B2
(45) Date of Patent: Jun. 28, 2011

(54) LED DEVICE RADIATOR OF LED PROJECTION SYSTEM

(75) Inventor: Seong Hun Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 275 days.

(21) Appl. No.: 12/230,587

(22) Filed: Sep. 2, 2008

(65) Prior Publication Data

US 2009/0059580 A1 Mar. 5, 2009

(30) Foreign Application Priority Data

Sep. 3, 2007 (KR) .................. 10-2007-0088914

(51) Int. Cl.
*F21V 29/00* (2006.01)
(52) U.S. Cl. .................. 362/294; 362/373; 362/249.02
(58) Field of Classification Search .................. 362/294, 362/373, 547, 249.02; 361/717
See application file for complete search history.

(56) References Cited

U.S. PATENT DOCUMENTS

| | | | |
|---|---|---|---|
| 7,004,602 B2 * | 2/2006 | Waters | 362/242 |
| 2005/0117365 A1 * | 6/2005 | Menke | 362/555 |
| 2006/0227554 A1 * | 10/2006 | Yu | 362/294 |
| 2008/0273331 A1 * | 11/2008 | Moss et al. | 362/294 |
| 2008/0316750 A1 * | 12/2008 | Park | 362/294 |
| 2009/0059582 A1 * | 3/2009 | Kulkarni | 362/234 |
| 2009/0059604 A1 * | 3/2009 | Yu et al. | 362/373 |

FOREIGN PATENT DOCUMENTS

KR 10-2006-0097937 A 9/2006
KR 10-2007-0074142 A 7/2007

* cited by examiner

*Primary Examiner* — Robert May
(74) *Attorney, Agent, or Firm* — Birch, Stewart, Kolasch & Birch, LLP

(57) ABSTRACT

An LED device radiator of an LED projection system, and more particularly, a radiator for cooling an LED device used in an LED projector is disclosed. The radiator includes a red LED device connected to a first substrate, a green LED device connected to a second substrate, a blue LED device connected to a third substrate, a first heat sink connecting a rear surface of the first substrate such that heat emitted from the red LED device is transferred to the first heat sink, and a second heat sink connecting a rear surface of each of the second and third substrate such that heat emitted from the green LED device and the blue LED device is transferred to the second heat sink.

16 Claims, 4 Drawing Sheets

LED DEVICE RADIATOR OF LED PROJECTION SYSTEM

This application claims the benefit of the Korean Patent Application No. 10-2007-0088914, filed on Sep. 3, 2007, which is hereby incorporated by reference as if fully set forth herein.

BACKGROUND OF THE INVENTION

1. Field of the Invention

The present invention relates to a Light Emitting Diode (LED) device radiator for an LED projection system, and more particularly, to a radiator for cooling an LED device used in an LED projector.

2. Discussion of the Related Art

As satellite and digital broadcasting gain increasing market share, demand for and interest in large-screen displays having high brightness is increasing. Accordingly, expectations of projection systems and roles thereof are greatly increasing.

FIG. 1 illustrates a conventional projection apparatus. Now, the conventional projection apparatus will be described with reference to FIG. 1.

The conventional projection apparatus includes a light source 1, a Polarizing Beam Splitter (PBS) 13, a red filter 2, a red reflector 3, a blue filter 4, a first blue reflector 5, a second blue reflector 6, a red Liquid Crystal Display (LCD) 7, a green LCD 8, a blue LCD 9, a prism 10, a projection lens 11, and a screen 12.

The above-described conventional projection apparatus operates as follows.

Light emitted from the light source 1 is directed through the PBS 13 such that it is converted into different light components having a single polarized direction. Of the polarized light components, the red filter 2 transmits only a red light component and reflects green and blue light components.

Subsequently, the red light component transmitted through the red filter 2 is reflected by the red mirror 3 to thereby be introduced to the red LCD 7. Also, in the case of the green and blue light components reflected by the red filter 2, the blue filter 4 transmits only the blue light component and reflects the green light component. The reflected green light component is introduced to the green LCD 8.

The blue light component transmitted through the blue filter 4 is reflected by the first blue reflector 5 and the second blue reflector 6 in sequence and thereafter, is introduced to the blue LCD 9. The above-described respective red, blue, and green LCDs 7, 8, and 9 display images for respective colors using electric signals, and the prism 10 composes the respective color images. Finally, the resulting composed color image is enlarged by the projection lens 11, thereby being projected to the screen 12.

SUMMARY OF THE INVENTION

Accordingly, the present invention is directed to an LED device radiator of an LED projection system that substantially obviates one or more problems due to limitations and disadvantages of the related art.

An object of the present invention is to provide an LED device radiator, which can manage thermal characteristics of different colors of LED devices required to achieve improved stability and reduced size of an LED projection system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in accordance with a first aspect of the invention, a Light Emitting Diode (LED) device radiator of an LED projection system comprising: The radiator includes a red LED device connected to a first substrate, a green LED device connected to a second substrate, a blue LED device connected to a third substrate, a first heat sink connecting a rear surface of the first substrate such that heat emitted from the red LED device is transferred to the first heat sink, and a second heat sink connecting a rear surface of each of the second and third substrate such that heat emitted from the green LED device and the blue LED device is transferred to the second heat sink.

In accordance with a second aspect of the invention, there is provided an LED device radiator of an LED projection system comprising: a red LED device connected to a first substrate, a green LED device connected to a second substrate, a blue LED device connected to a third substrate, a first heat sink connecting a rear surface of the first substrate such that heat emitted from the red LED device is transferred to the first heat sink, a second heat sink connecting a rear surface of each of the second and third substrate such that heat emitted from the green LED device and the blue LED device is transferred to the second heat sink; and a cooling fan configured to provide airflow across a portion of the first heat sink and a portion of the second heat sink to cool the first heat sink and the second heat sink.

In accordance with a third aspect of the invention, there is provided an LED device radiator of an LED projection system comprising: a first heat sink made of metal, the first heat sink being locatable to come into contact with a rear surface of a substrate on which a red LED device is mounted such that heat emitted from the red LED device is transferable to the first heat sink, and a second heat sink made of metal, the second heat sink being locatable to come into contact with a rear surface of a substrate associated with each of a green LED device and a blue LED device such that heat emitted from each of the green LED device and the blue LED device is transferable to the second heat sink.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. However, the present invention is not limited to the following embodiments described herein, and may be embodied into other implementations. The embodiments introduced herein are provided only to exhaustively complete the disclosed contents and also, to sufficiently transmit the spirit of the invention to those skilled in the art. Wherever possible, the same reference numbers will be used throughout the drawings to refer to the same or like parts.

A Light Emitting Diode (LED) device is a semiconductor device having a reaction velocity several hundred times faster than a lamp upon application of current and also, a semi-permanent lifespan. In addition to these advantages, the LED device exhibits outstanding performance in reproducibility of colors. Therefore, it is desirable that the LED device be used as a light source of a projection system.

In particular, when blue, red, and green LED devices are used as light sources, it solves a problem of the prior art in that a white light source must be divided into plural light sources for respective colors. This can simplify the configuration of a projection system.

Figure 1:
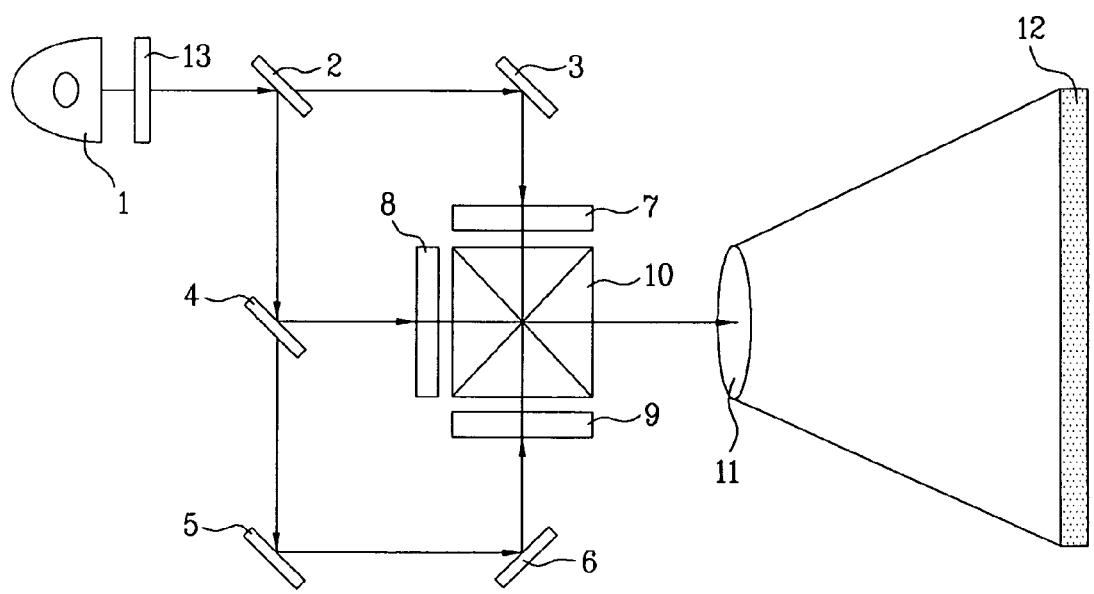
FIG. 1 is a diagram illustrating a conventional projection apparatus.

Specifically, the use of the blue, red, and green LED devices can eliminate a need for several filters, reflectors, etc. used for color separation in the previously-described conventional projection apparatus of FIG. 1, resulting in a simplified configuration.

However, LED devices tend to emit an enormous amount of light and thus, exhibit serious heat emission, although they are small-volume semiconductor devices occupying only a small area on a substrate.

Furthermore, LED devices have different thermal characteristics for respective colors and therefore, there exist a need to design different radiating configurations to conform to the characteristics of LED devices for respective colors.

It is known that red LED devices included in a projection system are the most vulnerable to heat. In addition, green LED devices play a major role in generation of white light and therefore, have the feature of requiring higher electric current than other colors of LED devices.

The thermal characteristics of LED devices for respective colors can be managed with the provision of a sufficient cooling space and cooling apparatus, so as to perform an effective cooling operation in correspondence to heat emission.

However, one reason for using LED light sources is to reduce the size of a projection system and therefore, a method for maximizing a cooling performance with a limited space and minimum cooling apparatus is necessary.

For this reason, a radiator configuration capable of managing the thermal characteristics of LED devices for respective colors is essential to achieve improved stability and reduced size of an LED projection system.

Figure 2:
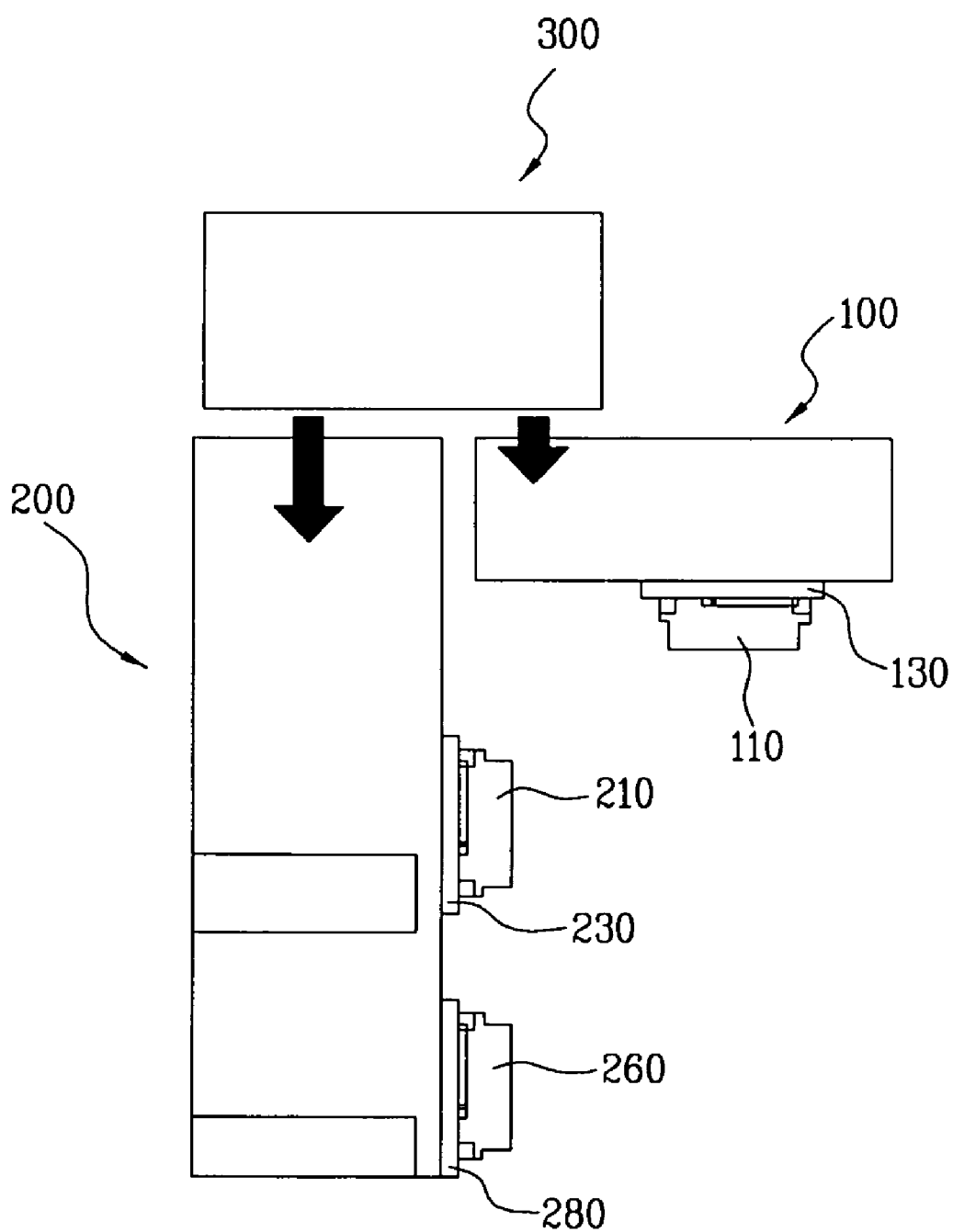
FIG. 2 is a diagram illustrating the configuration of an LED device radiator of an LED projection system according to the present invention.

FIG. 2 is a diagram illustrating the configuration of an LED device radiator of an LED projection system according to the present invention. As shown in FIG. 2, the LED device radiator of an LED projection system according to the present invention includes a first heat sink 100 for radiation of a red LED device 110, and a second heat sink 200 for radiation of a green LED device 210 and a blue LED device 260. The heat sinks are generally formed of high thermal conductivity metals, and as a representative example, may be formed of aluminum, copper, or the like.

As shown in FIG. 2, the LED device radiator of an LED projection system according to the present invention consists of two discrete heat sinks 100 and 200. Of the two heat sinks 100 and 200, the first heat sink 100 is provided to the red LED device 110. The reason why the red LED device 110 is mounted alone to the first heat sink 100 is that the red LED device 110 is more vulnerable to heat than other colors of LED devices.

If the red LED device 110 is mounted to the first heat sink 100 along with, for example, the green LED device 210, rather than being mounted alone, heat generated from the green LED device 210 is transferred to the red LED device 110, causing deterioration in the luminescence performance of the red LED device 110.

Therefore, it is preferred that the red LED device 110 be mounted to the first heat sink 100 alone.

The independent first heat sink 100 is preferably located close to a cooling fan 300 provided in the LED projection system, so as to be cooled by the cooling fan 300. As shown in FIG. 2, it is preferred that a partial rear surface of the first heat sink 100 be directly cooled by the cooling fan 300.

The reason why only the partial rear surface of the first heat sink 100, rather than the entire rear surface of the first heat sink 100, being cooled is that installing several fans in the LED projection system is undesirable and allowing both the first and second heat sinks 100 and 200 to share a single cooling fan is desirable.

As shown in FIG. 2, the cooling fan 300 can simultaneously cool both the first heat sink 100 and the second heat sink 200. Specifically, the cooling fan 300 may be installed such that at least a partial area of the cooling fan 300 has an overlapped blowing path with both the first heat sink 100 and the second heat sink 200.

The first heat sink 100 and the second heat sink 200, as described above, are spaced apart from each other within the LED projection system.

With the spaced arrangement, it is possible to prevent the first heat sink 100, provided with the red LED device 110, from being affected by heat emitted from other LED devices. Heat emitted from the red LED device 110 is conducted to, for example, a substrate on which the red LED device 110 is mounted and the conducted heat is again conducted to the first heat sink 100.

The heat, emitted from the red LED device 110 and conducted to the first heat sink 100, is cooled by the cooling fan 300 arranged close to the first heat sink 100.

Similarly, the second heat sink 200, provided for radiation of the green LED device 210 and the blue LED device 260, is spaced apart from the first heat sink 100, but is preferably arranged near the cooling fan 300.

The second heat sink 200 serves to emit heat conducted from substrates 230 and 280 on which the green LED device 210 and the blue LED device 260 are mounted, respectively. In this case, of the green LED device 210 and the blue LED device 260, the green LED device 210 is located close to the cooling fan 300.

As described above, the green LED device 210 is an essential component of the projection system to realize white light and also, plays a major role in enhancing the brightness of the projection system. Therefore, the green LED device 210 consumes more electricity and consequently, emits more heat than other LED devices.

Accordingly, of the green LED device 210 and the blue LED device 260 mounted to the second heat sink 200, the green LED device 210 is located close to the cooling fan 300.

In conclusion, the red LED device 110, which is vulnerable to heat, and the green LED device 210, exhibiting enormous heat emission, are located close to the cooling fan 300.

At least one of the heat sinks 100 and 200 constituting the LED device radiator of the LED projection system according to the present invention may include a radiating area expanding structure.

Figure 3:
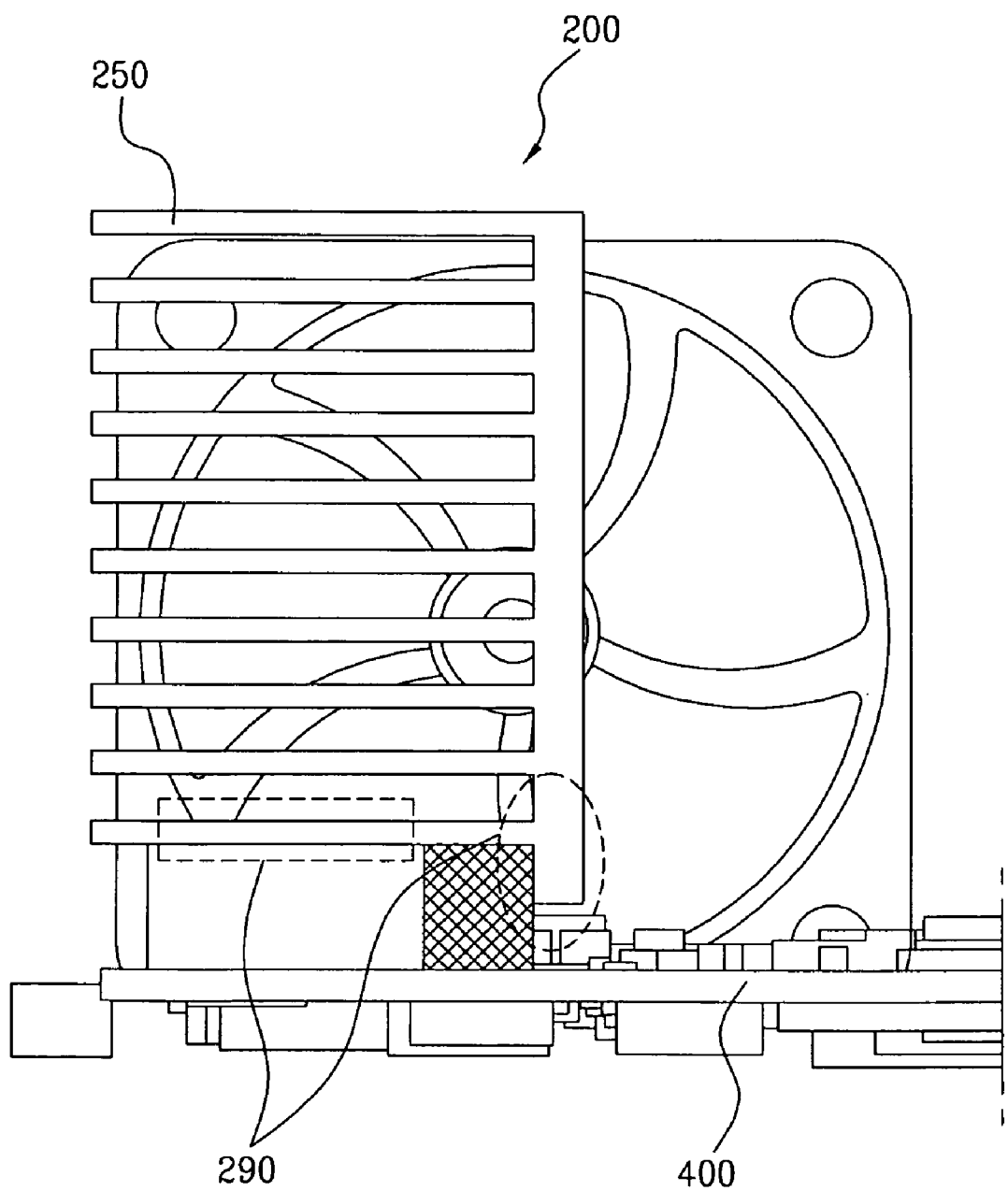
FIG. 3 is a view illustrating the shape of a second heat sink including a radiating area expanding structure according to an embodiment of the present invention.

FIG. 3 is a view illustrating the shape of the second heat sink 200 including a radiating area expanding structure 250 according to an embodiment of the present invention. As shown in FIG. 3, the radiating area expanding structure 250 serves to expand a radiating area from which heat conducted from the LED device is radiated.

The radiating area expanding structure 250 of the second heat sink 200 shown in FIG. 3 is constructed by a plurality of radiating plates as an assembly of spaced-apart plates.

With the use of the radiating area expanding structure 250 constructed by the plurality of radiating plates as an assembly of spaced-apart plates, the heat sink 200 can achieve not only an increased radiating area for heat exchange, but also creation of an air flow path, resulting in an improvement in radiation efficiency thereof.

Alternatively, the radiating area expanding structure 250 may be constructed by a plurality of radiating fins as an assembly of spaced-apart pillars.

The above-described radiating area expanding structure 250 may be provided at the first heat sink 100 and/or the second heat sink 200.

Preferably, the shape of the radiating area expanding structure 250 provided at the heat sink is determined such that the radiating area expanding structure 250 can define a path along which cool air generated by the cooling fan 300 can flow.

The heat sinks, included in the LED device radiator of the LED projection system according to the present invention, may be configured such that they come into contact with the substrates 130, 230, and 280 on which the LED devices are mounted and simultaneously, come into contact with elements on other substrates constituting the LED projection system.

In addition to the LED devices, a variety of elements mounted on substrates (such as a PCB substrate, etc.) also serve as heat emitting elements arranged in the LED projection system. Therefore, to achieve stability of the LED projection system as well as an extended lifespan thereof, the elements must be cooled.

However, since these heat emitting elements have a small size and are provided in great number, providing the respective heat emitting elements with heat sinks or cooling fans is difficult to implement due to costs, installation spaces, and the like. For this reason, it is preferred that the heat emitting elements share the heat sinks and the cooling fan 300 for cooling LED devices.

As shown in FIG. 3, the second heat sink 200 further includes circuit element contacts 290. In the embodiment of the present invention, the circuit element contacts 290 are regions coming into contact with circuit elements on a circuit board 400 of the radiating area expanding structure 250.

The circuit element contacts 290 may be employed in the stage of determining the shape of the heat sink in consideration of heat emitting characteristics of respective circuit elements.

Figure 4:
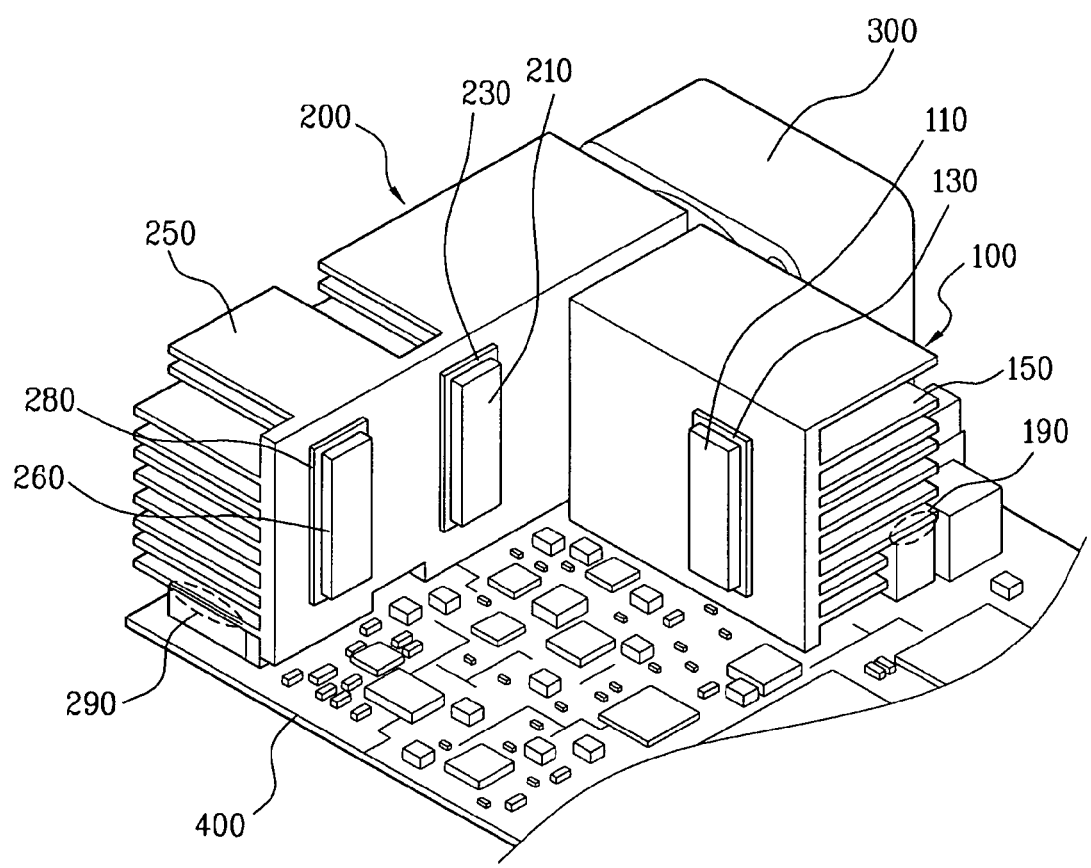
FIG. 4 is a perspective view illustrating the assembly relationship of a first heat sink, second heat sink, cooling fan, and circuit board, which constitute the LED device radiator of the LED projection system according to the present invention.

FIG. 4 is a perspective view illustrating the assembly relationship of the first heat sink 100, second heat sink 200, cooling fan 300, and circuit board 400, which constitute the LED device radiator of the LED projection system according to the present invention.

As shown in FIG. 4, the LED device radiator of the LED projection system according to the present invention can perform an efficient radiating operation within a limited space in consideration of heat emitting characteristics of the respective LED devices.

The first heat sink 100, to which the red LED device 110 is mounted, may include a radiating area expanding structure 150 to increase a radiating area thereof. Also, the shape of the first heat sink 100 may be determined such that the first heat sink 100 includes circuit element contacts 190 as regions coming into contact with other circuit elements on a substrate.

As apparent from the above description, to maximize the radiating performance of a heat sink constituting an LED device radiator of an LED projection system according to the present invention, it is preferred that detailed configurations of the heat sink be determined, in consideration of heat emitting characteristics and heat emitting amounts of respective elements, in a final stage of designing the LED projection system except for the heat sink.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A Light Emitting Diode (LED) device radiator for an LED projection system comprising:
   a red LED device connected to a first substrate;
   a green LED device connected to a second substrate;
   a blue LED device connected to a third substrate;
   a circuit board comprising a circuit element to drive the projection system;
   a first heat sink connected to a surface of the first substrate such that heat emitted from the red LED device is transferred to the first heat sink; and
   a second heat sink connected to a surface of the second substrate and the third substrate such that heat emitted from the green LED device and the blue LED device is transferred to the second heat sink,
   wherein at least one of the first heat sink and the second heat sink comprises a radiating area expanding structure,
   wherein the radiating area expanding structure comprises a plurality of radiating plates, and
   wherein the radiating area expanding structure comprises a circuit element contact such that at least one of the plurality of radiating plates is in contact with the circuit element.

2. The radiator according to claim 1, wherein the plates of the plurality of radiating plates are spaced from each other.

3. The radiator according to claim 1, wherein the radiating area expanding structure is an integral element of said at least one of the first heat sink and the second heat sink.

4. The radiator according to claim 1, wherein one of the first heat sink contacts another substrate element while contacting the first substrate and the second heat sink contacts another substrate element while contacting the second and third substrates.

5. The radiator according to claim 4, wherein said another substrate element is mounted on a substrate independent of the first, second, and third substrates.

6. The radiator according to claim 1, wherein the first and second heat sinks comprise metal.

7. The radiator according to claim 1, wherein the first heat sink is connected to a rear surface of the first substrate and the second heat sink is connected to a rear surface of the second substrate.

8. An LED device radiator for an LED projection system comprising:
   a red LED device connected to a first substrate; a green LED device connected to a second substrate; a blue LED device connected to a third substrate;
   a first heat sink connecting connected to a surface of the first substrate such that heat emitted from the red LED device is transferred to the first heat sink;
   a second heat sink connecting connected to a surface of the second substrate and the third substrate such that heat emitted from the green LED device and the blue LED device is transferred to the second heat sink; and
   a cooling fan configured to provide airflow across a portion of the first heat sink and a portion of the second heat sink to cool the first heat sink and the second heat sink,
   wherein the cooling fan has a first part facing the first heat sink and a second part facing the second heat sink such that the cooling fan has an overlapped blowing path with both the first heat sink and the second heat sink;
   wherein at least one of the first heat sink and the second heat sink comprises a radiating area expanding structure to expand a radiating area of said at least one of the first heat sink and second heat sink;
   wherein the radiating expanding area structure comprises a circuit element contact in contact with a circuit element of a circuit board to drive the projection system; and
   wherein the radiating area expanding structure is selected from a plurality of radiating plates comprising an assembly of spaced-apart plates and a plurality of radiating fins comprising an assembly of spaced-apart pillars.

9. The radiator according to claim 8, wherein the radiating area expanding structure is an integral element of said at least one of the first heat sink and the second heat sink.

10. The radiator according to claim 8, wherein one of the first heat sink contacts another substrate element while contacting the first substrate and the second heat sink contacts another substrate element while contacting the second and third substrates.

11. The radiator according to claim 10, wherein said another substrate element is mounted on a substrate independent of the first, second, and third substrates.

12. The radiator according to claim 8, wherein the first and second heat sinks comprise metal.

13. The radiator according to claim 8, wherein the cooling fan faces a rear surface of the first heat sink and a side surface of the second heat sink.

14. The radiator according to claim 8, wherein a shortest distance between the cooling fan and the first heat sink is substantially the same as a shortest distance between the cooling fan and the second heat sink.

15. The radiator according to claim 8, further comprising a circuit board mounting circuit elements to drive the projection system.

16. The radiator according to claim 8, wherein the green LED device is located closer to the cooling fan than the blue LED device.

* * * * *